(12) United States Patent
Bobsein et al.

(10) Patent No.: US 9,150,683 B2
(45) Date of Patent: Oct. 6, 2015

(54) RHEOLOGY MODIFIER

(71) Applicant: Rohn and Haas Company, Philadelphia, PA (US)

(72) Inventors: Barrett R. Bobsein, Sellersville, PA (US); John J. Rabasco, Allentown, PA (US)

(73) Assignee: Rohn and Haas Company, Philadelphia, PA (US)

( * ) Notice: Subject to any disclaimer, the term of this patent is extended or adjusted under 35 U.S.C. 154(b) by 309 days.

(21) Appl. No.: 13/706,401

(22) Filed: Dec. 6, 2012

(65) Prior Publication Data

US 2013/0158194 A1    Jun. 20, 2013

Related U.S. Application Data

(60) Provisional application No. 61/570,332, filed on Dec. 14, 2011.

(51) Int. Cl.

| | |
|---|---|
| *C08G 18/08* | (2006.01) |
| *C08G 18/28* | (2006.01) |
| *C08G 18/22* | (2006.01) |
| *C08G 18/06* | (2006.01) |
| *C08G 18/48* | (2006.01) |
| *C08G 18/79* | (2006.01) |
| *C09D 7/00* | (2006.01) |
| *C08G 18/10* | (2006.01) |

(52) U.S. Cl.
CPC .............. *C08G 18/06* (2013.01); *C08G 18/10* (2013.01); *C08G 18/2805* (2013.01); *C08G 18/4833* (2013.01); *C08G 18/791* (2013.01); *C09D 7/002* (2013.01)

(58) Field of Classification Search
None
See application file for complete search history.

(56) References Cited

U.S. PATENT DOCUMENTS

| | | | |
|---|---|---|---|
| 4,155,892 A | 5/1979 | Emmons et al. | |
| 4,180,491 A | 12/1979 | Kim et al. | |
| 6,642,302 B2 | 11/2003 | Wamprecht et al. | |
| 7,432,325 B2 | 10/2008 | Blankenship et al. | |
| 7,868,122 B2 | 1/2011 | Steinmetz | |
| 8,907,008 B2 | 12/2014 | Rabasco et al. | |
| 2002/0183442 A1 | 12/2002 | Wamprecht et al. | |
| 2002/0188061 A1 | 12/2002 | Wamprecht et al. | |
| 2009/0318595 A1 | 12/2009 | Steinmetz et al. | |
| 2010/0261813 A1* | 10/2010 | Bobsein et al. | 524/48 |
| 2012/0101171 A1* | 4/2012 | Turk et al. | 514/772.3 |

* cited by examiner

*Primary Examiner* — Susannah Chung
*Assistant Examiner* — Robert T Butcher
(74) *Attorney, Agent, or Firm* — Reid S. Willis

(57) ABSTRACT

The present invention relates to a process for preparing hydrophobically modified alkylene oxide polyurethanes by polymerizing, in the presence of a catalyst, a solvent-free melt of a polyisocyanate branching agent; a water-soluble polyalkylene glycol having an $M_w$ of from 2000 to 11,000 Daltons; and a diisocyanate; wherein the solvent-free melt further includes a hydrophobic capping agent, or a hydrophobic capping agent is added to the melt after the addition of catalyst. Hydrophobically modified alkylene oxide polyurethanes prepared by the process of the present invention show excellent ICI/KU properties and are useful as thickeners for coatings formulations.

9 Claims, No Drawings

RHEOLOGY MODIFIER

BACKGROUND OF THE INVENTION

The present invention relates to hydrophically modified urethane polymers, which are used as rheology modifiers in waterborne coatings formulations.

Rheology modifiers are used in waterborne coatings formulations to control viscosity over a wide shear rate range. They may be associative (they associate with the dispersed phase) or non-associative (they thicken the water phase). Associative thickeners may be derived from natural products such as hydrophobically modified cellulose ethers, or prepared from synthetic polymers such as hydrophobically modified ethylene oxide urethane (HEUR) polymers. A typical description of HEUR polymers and their preparation can be found in US 2009/0318595 A1, which describes forming a combination of linear and branched HEUR polymers by reacting a polyglycol, a hydrophobic alcohol, a diisocyanate, and a triisocyanate together in a one-pot reaction.

U.S. Pat. No. 4,155,892 (Emmons et al.) describes the preparation of linear as well as branched HEUR polymers in separate examples.

Rheology modifiers are typically classified as either low shear rate viscosity builders (Stormer viscosity builders, also known as KU viscosity builders) or high shear rate viscosity builders (ICI builders). It is desirable to increase ICI viscosity and the efficiency of ICI building rheology modifiers without concomitant increase in KU viscosity because such increase limits the formulator's ability to add a KU building rheology modifier to the formulation.

The commercially available HEUR polymers ACRYSOL™ 5000 and ACRYSOL™ 6000 rheology modifiers (a trademark of The Dow Chemical Company or its Affiliates) exhibit ICI viscosities of 1.75 and 2.40 respectively and KU viscosities of 79.3 and 109.7 respectively in an acrylic semi-gloss white paint. It would be advantageous to obtain a hydrophobically modified urethane polymer formulation with an increased ICI/KU viscosity ratio in comparison to these known rheology modifiers.

SUMMARY OF THE INVENTION

The present invention addresses a need in the art by providing a process comprising contacting a solvent-free melt of a polyisocyanate branching agent; a water-soluble polyalkylene glycol having an $M_w$ of from 2000 to 11,000 Daltons; and a diisocyanate with a polymerization promoting catalyst under conditions sufficient to form a hydrophobically modified alkylene oxide urethane polymer; with the proviso that either: 1) the solvent-free melt further includes a hydrophobic capping agent prior to contact of the melt with the catalyst; or 2) a hydrophobic capping agent is added to the melt after contact of the melt with the catalyst; wherein the molar equivalent ratio of glycol to polyisocyanate branching agent is from 4 to 20; and the molar equivalent ratio of total isocyanate groups to glycol hydroxyl groups is 1.1 to 1.6.

The hydrophobically modified alkylene oxide urethane polymer prepared by the process of the present invention is useful as a solvent-free thickener for coatings formulations.

DETAILED DESCRIPTION OF THE INVENTION

The present invention is a process comprising contacting a solvent-free melt of a polyisocyanate branching agent; a water-soluble polyalkylene glycol having an $M_w$ of from 2000 to 11,000 Daltons; and a diisocyanate with a polymerization promoting catalyst under conditions sufficient to form a hydrophobically modified alkylene oxide urethane polymer; with the proviso that either: 1) the solvent-free melt further includes a hydrophobic capping agent prior to contact of the melt with the catalyst; or 2) a hydrophobic capping agent is added to the melt after contact of the melt with the catalyst; wherein the molar equivalent ratio of glycol to polyisocyanate branching agent is from 4 to 20; and the molar equivalent ratio of total isocyanate groups to glycol hydroxyl groups is 1.1 to 1.6.

As used herein the term polyisocyanate branching agent is a compound containing at least three isocyanate groups. Examples of a preferred class of polyisocyanate branching agents include isocyanurate trimers and biuret trimers, which are characterized by the following formulas:

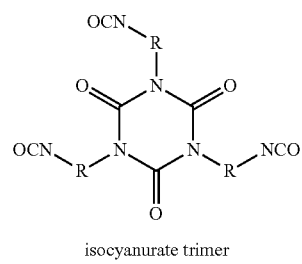

isocyanurate trimer

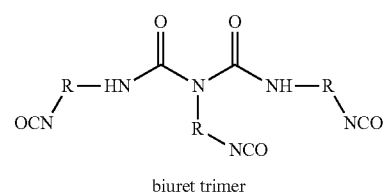

biuret trimer where R is a $C_4$-$C_{30}$-alkylene group, more particularly a $C_4$-$C_{20}$-alkylene group. As used herein, the term "alkylene group" refers to a biradical saturated or partially saturated hydrocarbyl group that is linear-, branched-, or cycloaliphatic or a combination thereof. Specific examples of suitable isocyanurate trimers, which are preferred, include HDI isocyanurate (HDI trimer), and IPDI isocyanurate (IPDI trimer). The structures of these cyanurate compounds are illustrated:

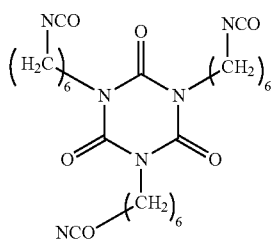

HDI isocyanurate (HDI trimer)

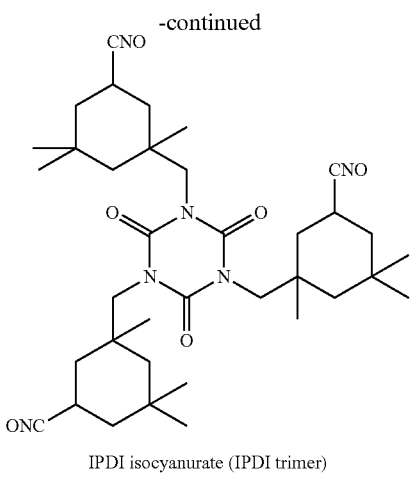

IPDI isocyanurate (IPDI trimer)

Persons of ordinary skill in the art recognize that isocyanurate trimers generally include lower levels of oligomers (pentamers, heptamers, etc.) that impart higher order isocyanate functionality to the compound. Accordingly, the term "isocyanate trimer" may include the trimer by itself or as a mixture of trimer and other oligomers. In fact, the commercially available HDI trimer Desmodur N3600 polyisocyanate trimer has a stated equivalent weight of 183 g/mol, which is higher than the equivalent weight of pure trimer, 164 g/mol, due to the presence of small amounts of higher order oligomers.

The polyisocyanate branching agent may also be a reaction product of a diisocyanate, preferably an aliphatic diisocyanate, and a polyol branching agent. As used herein, the term polyol branching agent refers to a compound with at least three hydroxyl groups. Examples of suitable polyol branching agents include trimethylol propane, pentaerythritol, glycerol, erythritol, sorbitol, and mannitol, as well as ethoxylates of these compounds.

An example of a polyisocyanate branching agent formed from the reaction of an aliphatic diisocyanate, and a polyol branching agent is a polyisocyanate branching agent formed by the reaction of a glycerol ethoxylate and a diisocyanate. The structure of the glycerol ethoxylate is illustrated:

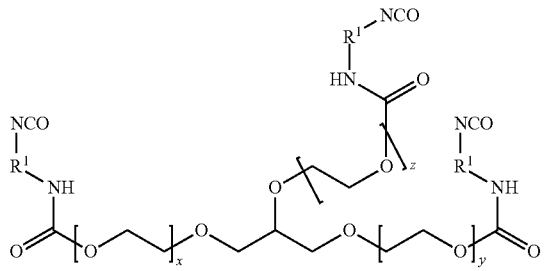

where each $R^1$ is independently a $C_4$-$C_{20}$ linear, branched, aromatic, or cycloaliphatic group, or a combination thereof; and x+y+z is from 0 to 200.

The term "water-soluble polyalkylene glycol" refers to one or more water-soluble polyethylene oxides, water-soluble polyethylene oxide/polypropylene oxide copolymers, water-soluble polyethylene oxide/polybutylene oxide copolymers, and polyethylene oxide/polypropylene oxide/polybutylene oxide terpolymers. As used herein, the term propylene oxide refers to either a polymer having —(OCH$_2$CH$_2$CH$_2$)— and/or —(OCH(CH$_3$)CH$_2$)— repeating groups.

Preferred water-soluble polyalkylene oxides are polyethylene glycols, particularly polyethylene glycols having a weight average molecular weight in the range of from 2000 to 11,000 Daltons, preferably in the range of from 4000 to 10,000 Daltons. An example of a suitable polyethylene glycol is PEG 8000, which is commercially available as CARBOWAX™ 8000 Polyethylene Glycol (a trademark of The Dow Chemical Company or its Affiliates).

The diisocyanate is preferably a $C_4$-$C_{20}$ aliphatic or aromatic diisocyanate, or a combination thereof. As used herein, "aliphatic" refers to saturated or partially unsaturated linear-, branched-, or cycloaliphatic, or combinations thereof. Examples of suitable diisocyanates include 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis(isocyanatocyclohexane), 1,4-cyclohexylene diisocyanate, isophorone diisocyanate, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenyldiisocyanate, 1,5-naphthylene diisocyanate, and 1,5-tetrahydronaphthylene diisocyanate. Aliphatic diisocyanates are preferred, with 1,6-hexamethylene diisocyanate and isophorone diisocyanate being more preferred.

As used herein, the term "hydrophobic capping agent" refers to a monofunctional compound comprising six or more carbon atoms that has a hydrophobic portion and that is capable of reacting with an isocyanate group; preferably the hydrophobic capping agent is an alcohol or an alkoxylate thereof; an amine or an alkoxylate thereof; or a tertiary aminoalcohol or an alkoxylate thereof; more preferably, the hydrophobic capping agent is represented by the formula $R^1$—X—(CH$_2$CHR$^3$—O)$_m$—H; where X=O, NH, or NR$^2$; $R^1$ and $R^2$ independently $C_6$ to $C_{18}$, linear, branched, cyclic, aromatic, or combinations thereof; each $R^3$ is independently H, $C_1$-$C_6$ linear or branched, $C_3$-$C_6$ cyclic, or phenyl; and m is 0 to 50, more preferably 0 to 30.

More preferably still, the hydrophobic capping agent is a $C_6$-$C_{18}$ alcohol or an ethoxylate thereof; a $C_6$-$C_{18}$ amine or an ethoxylate thereof; or a $C_6$-$C_{18}$ tertiary aminoalcohol or an ethoxylate thereof. Examples of suitable alcohols include n-octanol, n-nonanol, n-decanol, n-undecanol, n-dodecanol, 2-ethylhexanol, 2-butyl-1-octanol, and 3,7-dimethyl-1-octanol. Examples of suitable amines include n-hexyl amine, n-octyl amine, n-decyl amine, n-dodecyl amine, benzyl amine, di-n-hexyl amine, 2-ethylhexyl amine, dicyclohexyl amine, and dibenzyl amine. Examples of suitable tertiary aminoalcohols and alkoxylates thereof include reaction products of dialkyl amines and epoxies or alkyl glycidyl ethers; examples of suitable dialkyl amines include dimethylamine, diethylamine, dipropylamine, diisopropylamine, dibutylamine, diamylamine, dihexylamine, bis-(2-ethylhexyl) amine, dicyclohexylamine, and dibenzylamine; examples of suitable epoxies include ethylene oxide, propylene oxide, butylenes oxide, 1,2-epoxydecane and 1,2-epoxydodecane; and examples of suitable alkyl glycidyl ethers include isopropyl glycidyl ether, butyl glycidyl ether, isobutyl glycidyl ether, 2-ethylhexyl glycidyl ether, phenyl glycidyl ether, t-butyl phenyl glycidyl ether. Examples of other suitable alkoxylated hydrophobic capping agents include the product of a branched alcohol such as 2-butyl-1-octanol or a linear alcohol such as n-dodecanol, with an ethylene oxide, a propylene oxide, or a butylene oxide.

Small amounts of a non-hydrophobic capping agent may optionally be used along with the hydrophobic capping agent to tune thickening efficiencies and other paint formulation properties. An example of such a non-hydrophobic capping agent includes a methoxylated polyethylene glycol such as Polyglykol M2000 polyethylene glycol monomethyl ether.

The molar equivalent ratio of diol to polyisocyanate branching agent is from 4 to 20, preferably 6 to 18, more preferably 6 to 15. As used herein, the term molar equivalent ratio refers to the number of hydroxyl or isocyanate groups in the reactant. Thus, for example, 10 moles of a polyethylene glycol has two hydroxyl groups per mole, and 1 mole of a triisocyanate has three isocyanate groups per mole; the molar equivalent ratio of glycol hydroxyl groups to triisocyanate groups is $(10*2)/(1*3)$=or 6.67.

The hydrophobically modified alkylene oxide urethane polymer can be prepared in a one-stage reaction wherein the polyisocyanate branching agent, the water-soluble polyalkylene glycol, the diisocyanate, and capping agent are blended together and heated to a temperature sufficient to form a melt, typically to a temperature in the range of 70° C. to 120° C., more preferably in the range of 85° C. to 115° C., followed by addition of a suitable catalyst that promotes urethane linkage formation. A preferred catalyst in one-stage polymerization is a bismuth catalyst such as bismuth 2-ethylhexanoate, commercially available as bismuth octoate liquid MSF 28%.

Alternatively, the polymer can be prepared in two stages: In a first stage, a mixture containing the polyisocyanate branching agent, the water-soluble polyalkylene glycol, the diisocyanate, and catalyst is heated to a temperature sufficient to form a melt and polymerize, preferably to a temperature in the range of 70° C. to 120° C., more preferably 85° C. to 115° C., to form the intermediate uncapped polymer. Preferably, the capping agent is added after substantial consumption of the water-soluble polyalkylene glycol, and reaction is continued to completion to form the final polymer. As used herein, the term "substantial consumption of the water-soluble polyalkylene glycol" means that at least 90%, more preferably at least 95%, and most preferably at least 99% of the water-soluble polyalkylene glycol is consumed. Examples of suitable catalysts in a two-stage polymerization include bismuth catalysts such as bismuth octoate; tin catalysts such as dibutyl tin dilaurate; mercury catalysts such as phenyl mercuric neodecanoate; zinc catalysts; lead catalysts; tertiary amines such as triethylamine, bis(2-dimethylaminoethyl)methylamine, 1,4-diazabicyclo[2.2.2]octane, dimethylcyclohexylamine, and 1,8-diazabicyclo[5.4.0]undec-7-ene.

The hydrophobically modified alkylene oxide urethane polymer prepared by the process of the present invention is useful as solvent-free thickener for a coatings composition, which may include one or more of the following components: Fillers; pigments, such as titanium dioxide, mica, calcium carbonate, silica, zinc oxide, milled glass, aluminum trihydrate, talc, antimony trioxide, fly ash, and clay; polymer encapsulated pigments, such as polymer-encapsulated or partially encapsulated pigment particles such as titanium dioxide, zinc oxide, or lithopone particles; polymers or polymer emulsions adsorbing or bonding to the surface of pigments such as titanium dioxide; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and additional neutralizing agents, such as hydroxides, amines, ammonia, and carbonates.

Although the thickener prepared by the process of the present invention is prepared in the absence of solvent, it may be desirable, in some instances, to add some solvent to the coatings composition to provide, for example, improved freeze-thaw properties of the coating.

EXAMPLES

The following examples are for illustrative purposes only and are not intended to limit the scope of the invention.

Example 1

Preparation of a Polyisocyanate Branched HEUR Polymer

In the following procedure, the PEG:HDI-trimer ratio was 11.5 and the total NCO:Diol ratio was 1.28. CARBOWAX™ 8000 Polyethylene Glycol (PEG, a trademark of the Dow Chemical Company or its Affiliates, molecular weight 8200; 1521.8 g, 0.3712 molar equivalents of OH) was heated to 110° C. in vacuo in a batch melt reactor for 2 h. After cooling to 85° C., butylated hydroxytoluene (BHT, 0.159 g) and decanol (19.8 g, 0.1251 molar equivalents of OH) were added and the reaction was stirred for 5 min. Desmodur N3600 polyisocyanate (HDI-trimer, 5.91 g, 0.0323 molar equivalents of NCO) and Desmodur H diisocyanate (HDI, 37.32 g, 0.4435 molar equivalents of NCO) was then added followed by 5 minutes of stirring. Bismuth octoate solution (28%, 3.80 g) was then added to the reactor and the resulting mixture was stirred for 10 min. The resulting molten polymer was removed from the reactor and cooled.

Examples 2-6

Preparation of Polyisocyanate Branched HEUR Polymer

The procedures for Examples 2-5 were carried out substantially as described in Example 1 except the PEG:HDI-trimer molar equivalent ratio and the total NCO:Diol molar equivalent ratio were as specified in Table 1:

TABLE 1

Ratios of PEG:HDI and Total NCO:Diol

| | PEG:HDI-Trimer Ratio | Total NCO:Diol Ratio |
|---|---|---|
| Example 2 | 6.0 | 1.28 |
| Example 3 | 11.5 | 1.50 |
| Example 4 | 6.0 | 1.50 |
| Example 5 | 18.0 | 1.50 |

Example 6

Preparation of In-Situ-Generated Polyisocyanate Branched HEUR Polymer

In the following procedure, the PEG:triol ratio was 11.50 and total NCO:(diol+triol) ratio was 1.28. To a 100-mL round bottom flask equipped with condenser, thermocouple, mechanical stirrer, and nitrogen inlet was added trimethylolpropane (TMP, 1.71 g, 0.0383 molar equivalents of OH) and HDI (51.48 g, 0.6118 molar equivalents of NCO). This reaction mixture was heated to 55° C. with stirring until the TMP was melted. After cooling to 45° C., one drop of dibutyl tin dilaurate was added to the hazy reaction mixture. The appearance of the reaction mixture immediately turned clear and the exotherm was allowed to heat the reaction mixture to 55° C., followed by holding at this temperature with stirring for 15 min. The reaction mixture was then cooled to room temperature.

PEG (1502.0 g, 0.3663 molar equivalent of OH) was heated to 110° C. under vacuum in a batch melt reactor for 2 h. After cooling to 85° C., BHT (0.157 g) and decanol (21.46 g, 0.1356 molar equivalent of OH) were added and the reaction was stirred for 5 minutes. The TMP/HDI reaction product mixture prepared above (44.38 g) was added followed by 5 min of stirring. Bismuth octoate solution (28%, 3.76 g) was then added to the reactor and the resulting mixture was stirred for 10 min. The resulting molten polymer was removed from the reactor and cooled.

Example 7

Preparation of Polyisocyanate Branched HEUR Polymer with a Tertiary Amino Alcohol In the following procedure, the PEG:HDI-trimer ratio was 15.5 and total NCO:Diol was 1.25. Diamylamine (372.4 g), butyl glycidyl ether (346.2 g) and water (27 g) were heated to reflux (105-115° C.) under $N_2$ in a round bottom flask equipped with a condenser and mechanical stirrer. After 5 h, the mixture was cooled to 30° C. The resulting aminoalcohol product was isolated after water and residual butyl glycidyl ether were removed via vacuum distillation (14 mm Hg) over a temperature range of 30-150° C.

PEG (1708.7 g, 0.4168 molar equivalents of OH) was heated to 110° C. in vacuo in a batch melt reactor for 2 h. After cooling to 85° C., BHT (0.18 g) and the aminoalcohol (36.04 g, 0.1255 molar equivalents of OH) were added and the reaction was stirred for 5 minutes. HDI-trimer (4.92 g, 0.0269 molar equivalents of NCO) and HDI (41.46 g, 0.4927 molar equivalents of NCO) were then added followed by 5 min of stirring. Bismuth octoate solution (28%, 4.27 g) was then added to the reactor and the resulting mixture was stirred for 10 min. The resulting molten polymer was removed from the reactor and cooled.

Comparative Example 1

Preparation of Trimethylolpropane Branched HEUR Polymer

In the following example, the PEG:triol ratio was 11.50 and the total NCO:(diol+triol) was 1.28. PEG (1590.6 g, 0.3880 molar equivalents of OH) was heated to 110° C. in vacuo in a batch melt reactor for 2 h. After cooling to 85° C., BHT (0.166 g), decanol (22.73 g, 0.1436 molar equivalents of OH), and TMP (1.51 g, 0.0338 molar equivalents of OH) were added and the reaction was stirred for 5 min. HDI (45.49 g, 0.5406 molar equivalents of NCO) was added followed by 5 min of stirring. Bismuth octoate solution (28%, 3.98 g) was then added to the reactor and the resulting mixture was stirred for 10 min. The resulting molten polymer was removed from the reactor and cooled.

Description of Thickener Evaluation in Paint

A latex paint composition, Pre-paint #1, was prepared by combining the components of Table 2:

TABLE 2

| Pre-paint #1 Formulation | |
|---|---|
| Kronos 4311 titanium dioxide slurry | 262.8 g |
| Water | 180.1 g |

TABLE 2-continued

| Pre-paint #1 Formulation | |
|---|---|
| Ethylene glycol | 24.3 g |
| ROPAQUE ™ Ultra opaque polymer | 49.7 g |
| RHOPLEX ™ SG-30 Binder | 420.9 g |
| Drewplus L-475 defoamer | 4.0 g |
| Texanol coalescent | 19.2 g |
| Triton X-405 surfactant | 2.5 g |
| Total | 963.5 g |

ROPAQUE and RHOPLEX are Trademarks of The Dow Chemical Company or its Affiliates.

The formulated paint was obtained by adding aqueous thickener dispersion and water to Pre-paint #1 (963.5 g). To maintain constant solids of the fully formulated paint, the combined weight of the added thickener and water was 49.5 g. The density of the fully formulated paint was 1013 lbs/100 gal (1.2 Kg/L). The pH of the fully formulated paints was in the range of 8.5 to 9.0.

Formulated paints were made as follows: To Pre-paint #1 (963.5 g) were slowly added aqueous thickener dispersion (40.0 g) and water (9.5 g). The mixture was stirred for 10 min. The aqueous thickener dispersions were made by adding dried solid thickener wax (10.0 g), methyl-beta-cyclodextrin (1.0 g of a 50% solution) and water (39.0 g) to a 50-mL plastic centrifuge tube. The tubes were capped and mounted on a rotator for continuous tumbling over 48 h until the aqueous thickener dispersions were homogeneous. Following a 24 h equilibration at room temperature, the thickened paint was stirred for 1 min on a lab mixer before measuring viscosity values. Table 3 shows the KU, ICI, and ICI/KU values for paints formulated with HEUR thickeners of the examples. As Table 3 shows, the process of the present invention provides a solvent-free thickener that can be used to prepare coatings formulations with an excellent balance of ICI and KU properties.

TABLE 3

Paint data in a Semigloss White Paint.

| HEUR Example | PEG:HDI Trimer (or Triol) Ratio | Total NCO:(Diol + Triol) | KU | ICI | ICI/ KU(*100) |
|---|---|---|---|---|---|
| Ex. 1 | 11.5 | 1.28 | 77.6 | 1.90 | 2.45 |
| Ex. 2 | 6.0 | 1.28 | 88.8 | 2.30 | 2.59 |
| Ex. 3 | 11.50 | 1.50 | 79.0 | 2.00 | 2.53 |
| Ex. 4 | 6.0 | 1.50 | 84.8 | 2.10 | 2.48 |
| Ex. 5 | 18.0 | 1.50 | 76.6 | 1.80 | 2.35 |
| Ex. 6 | 11.5 | 1.28 | 79.7 | 1.90 | 2.38 |
| Comp. Ex 1 | 11.5 | 1.28 | 75.8 | 1.70 | 2.24 |

A latex paint composition, Pre-paint #2, was prepared by combining components of Table 4:

TABLE 4

| Pre-paint #2 Formulation | |
|---|---|
| Ti-Pure R-746 titanium dioxide slurry | 349.8 g |
| TAMOL ™ 731A Dispersant | 7.5 g |
| BYK-348 surfactant | 1.0 g |
| Tego Foamex defoamer | 0.5 g |
| Mix the above on a Cowles dispersor and let down with the following | |
| water | 20.9 g |
| RHOPLEX ™ VSR-2015 Binder | 524.2 g |
| BYK-348 surfactant | 19.2 g |

TABLE 4-continued

Pre-paint #2 Formulation

| | |
|---|---|
| Tego Foamex defoamer | 1.0 g |
| Total | 905.4 g |

TAMOL and RHOPLEX are Trademarks of The Dow Chemical Company or its Affiliates.

The formulated VSR-2015 paint was obtained by adding aqueous thickener Example 7 dispersion and water to Pre-paint #2 (905.4 g). To maintain constant solids of the fully formulated paint, the combined weight of added thickener and water was 158.9 g. The density of the fully formulated paint was 1064 lbs/100 gal (1.3 Kg/L). The pH of the fully formulated paint was in the range of 8.5 to 9.0.

The formulated paint was made as follows: To Pre-paint #2 (905.4 g) were slowly added aqueous thickener Example 7 dispersion (25.0 g), ammonia (1.0 g) and water (132.9 g). The mixture was stirred for 10 min. The aqueous thickener Example 8 dispersion was made by adding dried solid thickener wax (10.0 g), lactic acid (0.5 g, 85% solids) and water (39.5 g) to a 50-mL plastic centrifuge tube. The tube was capped and mounted on a rotator for continuous tumbling over 48 h until the aqueous thickener dispersions were homogeneous. Following a 24-h equilibration at room temperature, the thickened paint was stirred for 1 min on a lab mixer before measuring viscosity values. The VSR-2015 paint thickened with Example 7 exhibited a KU value of 110.4 and an ICI value of 2.00 and an ICI/KU(*100) of 1.81.

The results show excellent ICI and ICI/KU(*100) values for thickeners made using the process of the present invention. The process has the additional advantage of being free of solvent, resulting in the absence or substantial absence of volatile organic solvents (VOCs). While not bound theory, it is believed that the method of the present invention provides an improved ICI/KU balance due to a more random distribution of branching points in the polymer backbone, leading to higher molecular weight between branch points and higher molecular weight between end group hydrophobes.

The invention claimed is:

1. A process comprising contacting a solvent-free melt of a polyisocyanate branching agent; a water-soluble polyalkylene glycol having an $M_w$ of from 2000 to 11,000 Daltons; and a diisocyanate with a polymerization promoting catalyst under conditions sufficient to form a hydrophobically modified alkylene oxide urethane polymer; with the proviso that either: 1) the solvent-free melt further includes a hydrophobic capping agent prior to contact of the melt with the catalyst; or 2) a hydrophobic capping agent is added to the melt after contact of the melt with the catalyst;
wherein the molar equivalent ratio of glycol to polyisocyanate branching agent is from 4 to 20; and the molar equivalent ratio of total isocyanate groups from the polyisocyanate branching agent and the diisocyanate to glycol hydroxyl groups is 1.1 to 1.6; and wherein the hydrophobic capping agent is an alcohol or an alkoxylate thereof, an amine or an alkoxylate thereof, or a tertiary aminoalcohol or an alkoxlyate thereof.

2. The process of claim 1 wherein the solvent-free melt further comprises a hydrophobic capping agent prior to contact of the melt with the catalyst; the process is carried out at a temperature in the range of 70° C. to 120° C.; the water-soluble polyalkylene glycol is a polyethylene glycol having $M_w$ of from 4000 to 10,000 Daltons; and the catalyst is a bismuth catalyst; wherein the hydrophobic capping agent is a $C_6$-$C_{18}$-alcohol or a $C_6$-$C_{18}$ tertiary aminoalcohol.

3. The process of claim 2 wherein the process is carried out at a temperature in the range of 85° C. to 115° C.; the polyisocyanate branching agent is hexamethylene diisocyanate isocyanurate; isophorone diisocyanate isocyanurate; tris(isocyanatohexyl)biuret; 1,6,11-undecane triisocyanate, or the reaction product of a diisocyanate and a polyol branching agent; the hydrophobic capping agent comprises at least one of n-octanol, n-nonanol, n-decanol, n-undecanol, n-dodecanol, 2-ethylhexanol, 2-butyl-1-octanol, or 3,7-dimethyl-1-octanol; and the catalyst is bismuth octoate;
wherein the molar equivalent ratio of hydroxyl groups in the glycol to isocyanate groups in the polyisocyanate branching agent is from 6 to 15; and the molar equivalent ratio of total isocyanate groups to glycol hydroxyl groups is 1.2 to 1.4.

4. The process of claim 3 wherein the polyisocyanate branching agent is hexamethylene diisocyanate isocyanurate, isophorone diisocyanate isocyanurate, or the reaction product of a diisocyanate and a glycerol ethoxylate, which reaction product has the following formula:

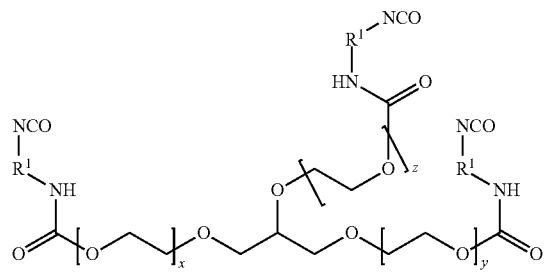

where each $R^1$ is independently a divalent $C_4$-$C_{20}$ linear, branched, or cycloaliphatic group, or a combination thereof; and x+y+z is in the range of 0 to 200.

5. The process of claim 1 wherein the hydrophobic capping agent is a $C_6$-$C_{18}$ alcohol which is added to the melt after contact of the melt with the catalyst; the process is carried out at a temperature in the range of 70° C. to 120° C.; the water-soluble polyalkylene glycol is a polyethylene glycol having $M_w$ of from 4000 to 10,000 Daltons; and the catalyst is a tertiary amine or a tin, bismuth, or zinc catalyst.

6. The process of claim 5 wherein the process is carried out at a temperature in the range of 85° C. to 115° C.; the polyisocyanate branching agent is hexamethylene diisocyanate isocyanurate; isophorone diisocyanate isocyanurate; tris(isocyanatohexyl)biuret; 1,6,11-undecane triisocyanate, or the reaction product of a diisocyanate and a polyol branching agent; the $C_6$-$C_{18}$ alcohol comprises at least one of n-octanol, n-nonanol, n-decanol, n-undecanol, n-dodecanol, 2-ethylhexanol, 2-butyl-1-octanol, or 3,7-dimethyl-1-octanol; and the catalyst is bismuth octoate;
wherein the molar equivalent ratio of glycol to polyisocyanate branching agent is from 6 to 15; and the molar equivalent ratio of total isocyanate groups to glycol hydroxyl groups is 1.2 to 1.4.

7. The process of claim 6 wherein polyisocyanate branching agent is hexamethylene diisocyanate isocyanurate, isophorone diisocyanate isocyanurate, or the reaction product of a diisocyanate and a glycerol ethoxylate, which reaction product has the following formula:

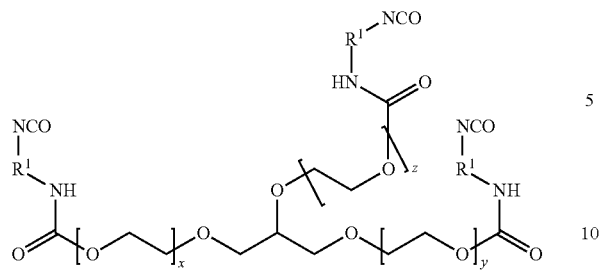

where each $R^1$ is independently a divalent $C_4$-$C_{20}$ linear, branched, or cycloaliphatic group, or a combination thereof; and $x+y+z$ is in the range of 0 to 200.

8. The process of claim 2 wherein the $C_6$-$C_{18}$ tertiary amino alcohol is a reaction product of a diamylamine and a butyl glycidyl ether; and the catalyst is bismuth octoate.

9. A composition comprising a binder, a pigment, and a hydrophobically modified alkylene oxide urethane polymer prepared by the process of claim 1.

* * * * *